(12) United States Patent
Ray et al.

(10) Patent No.: US 10,285,339 B2
(45) Date of Patent: May 14, 2019

(54) MORE EFFICIENT STRUCTURAL CELL FOR FACILITATING TREE ROOT GROWTH

(71) Applicant: DeepRoot Green Infrastructure, LLC, San Francisco, CA (US)

(72) Inventors: Charles Julian Ray, San Francisco, CA (US); Charles Graham Ray, Mill Valley, CA (US); John Cogger, Santa Ana, CA (US); James Urban, Annapolis, MD (US)

(73) Assignee: DEEPROOT GREEN INFRASTRUCTURE, LLC, San Francisco, CA (US)

( * ) Notice: Subject to any disclaimer, the term of this patent is extended or adjusted under 35 U.S.C. 154(b) by 0 days.

(21) Appl. No.: 15/686,573

(22) Filed: Aug. 25, 2017

(65) Prior Publication Data

US 2017/0347539 A1 Dec. 7, 2017

Related U.S. Application Data

(62) Division of application No. 14/684,214, filed on Apr. 10, 2015, now Pat. No. 9,775,303.

(51) Int. Cl.
*A01G 13/02* (2006.01)
*E03F 1/00* (2006.01)
(Continued)

(52) U.S. Cl.
CPC ............ *A01G 13/0237* (2013.01); *E01C 3/06* (2013.01); *E01C 9/005* (2013.01); *E03F 1/002* (2013.01); *Y02A 30/32* (2018.01)

(58) Field of Classification Search
CPC ............................ A01G 13/0237; E01C 9/005
See application file for complete search history.

(56) References Cited

U.S. PATENT DOCUMENTS

| 3,443,385 A | 5/1969 | Vollmer |
| 3,654,903 A | 4/1972 | Montgomery |

(Continued)

FOREIGN PATENT DOCUMENTS

| DE | 3202684 A1 | 8/1983 |
| DE | 3441098 A1 | 5/1986 |

(Continued)

OTHER PUBLICATIONS

Silva Cell 2 Overview.deeptroot.com. archived copy from Nov. 16, 2014 retrieved from the Internet on May 23, 2016, 5 pages.
(Continued)

*Primary Examiner* — Monica L Williams
(74) *Attorney, Agent, or Firm* — Innovation Counsel LLP

(57) ABSTRACT

A structural cell system for supporting hardscape, allowing tree root growth, and managing stormwater underneath the hardscape. The system may include: a base having a plurality of receptacles and a plurality of support members interconnecting the receptacles; a plurality of legs each sized and shaped to be attachable to the base within one of the receptacles so as to extend from the base, and to be attachable to another of the legs so that pairs of legs attached to each other collectively extend from the base; and a top attachable to the legs. Outer edges of the base, the top, and the legs attached thereto define a volume, and are configured to support at least that portion of the hardscape overlying the top as well as a commercial vehicle traffic load thereon, while maintaining soil in a substantially uncompacted state throughout at least approximately ninety percent of the volume.

9 Claims, 14 Drawing Sheets

(51) Int. Cl.
*E01C 9/00* (2006.01)
*E01C 3/06* (2006.01)

(56) References Cited

U.S. PATENT DOCUMENTS

| | | |
|---|---|---|
| 3,823,508 A | 7/1974 | Takehara |
| 4,060,991 A | 12/1977 | Reese |
| 4,771,572 A | 9/1988 | Riga |
| 4,937,973 A | 7/1990 | Schilling |
| 4,982,533 A | 1/1991 | Florence |
| 4,983,069 A | 1/1991 | Florence |
| 5,030,343 A | 7/1991 | Urriola |
| 5,086,594 A | 2/1992 | Florence |
| 5,195,284 A | 3/1993 | Florence |
| 5,249,885 A | 10/1993 | Florence |
| 5,322,629 A | 6/1994 | Stewart |
| 5,383,302 A | 1/1995 | Hill |
| 5,460,867 A | 10/1995 | Magnuson et al. |
| 5,810,510 A | 9/1998 | Urriola |
| 6,095,718 A | 8/2000 | Bohnhoff |
| 6,237,283 B1 | 5/2001 | Nalbandian et al. |
| 6,277,274 B1 | 8/2001 | Coffman |
| 6,428,870 B1 | 8/2002 | Bohnhoff |
| 6,537,446 B1 | 3/2003 | Sanguinetti |
| 6,540,436 B2 | 4/2003 | Ogi |
| 6,569,321 B2 | 5/2003 | Coffman |
| 6,779,946 B1 | 8/2004 | Urriola et al. |
| 8,608,401 B2 | 12/2013 | Gooden |
| 2001/0045383 A1 | 11/2001 | Coffman |
| 2002/0179509 A1 | 12/2002 | Wofford |
| 2003/0082359 A1 | 5/2003 | Scott |
| 2004/0076473 A1 | 4/2004 | Burkhart |
| 2005/0155285 A1 | 7/2005 | Urban et al. |
| 2008/0063935 A1 | 3/2008 | Ray et al. |
| 2008/0155891 A1 | 7/2008 | Lilborn |

FOREIGN PATENT DOCUMENTS

| | | |
|---|---|---|
| EP | 0943737 A1 | 9/1999 |
| GB | 2048635 A | 5/1979 |
| GB | 2440398 A | 1/2008 |
| JP | 63268823 A | 11/1988 |
| JP | 02161008 A | 6/1990 |
| JP | 04099411 A | 3/1992 |
| JP | 8-37945 A | 2/1996 |
| JP | 837945 A | 2/1996 |
| JP | H0837945 A | 2/1996 |
| JP | 9296486 A | 11/1997 |
| JP | 9-327239 A | 12/1997 |
| JP | H09327239 A | 12/1997 |
| JP | 10280493 A | 10/1998 |
| JP | 11-103676 A | 4/1999 |
| JP | H11103676 A | 4/1999 |
| JP | 2000073418 A | 3/2000 |
| JP | 2001098591 A | 4/2001 |
| JP | 2001323520 A | 11/2001 |
| JP | 2002097707 A | 4/2002 |
| JP | 2003113625 A | 4/2003 |
| WO | 2000050142 A2 | 8/2000 |

OTHER PUBLICATIONS

International Search Report corresponding to PCT/US2016/025896, dated Jun. 27, 2016, 2 pages.

Catalogue, "Greenleaf Urban Tree and Landscape Products", 0142717797, 2002, 23 pages.

MORE EFFICIENT STRUCTURAL CELL FOR FACILITATING TREE ROOT GROWTH

CROSS REFERENCE TO RELATED APPLICATIONS

This application is a divisional of U.S. patent application Ser. No. 14/684,214 filed Apr. 10, 2015 and titled "More Efficient Structural Cell For Facilitating Tree Root Growth", which is incorporated herein by reference in its entirety.

BRIEF DESCRIPTION

This invention relates generally to tree growth technology. More specifically, this invention relates to structural cells for more efficiently facilitating tree root growth and water retention.

BACKGROUND

The design of many modern dense urban landscapes often calls for the placement of trees within paved-over areas or areas covered by other hardscapes. In particular, such designs often call for trees to be placed in close proximity to roads, sidewalks, and other load bearing pathways. However, the design and construction methods of these pathways and the loads they carry often compact the soil underneath to such an extent that it is often difficult for tree roots to sufficiently penetrate the soil. As a result, trees planted in close proximity to these hardscapes may not survive or grow to the full extent envisioned.

Various solutions to this problem have been proposed. For example, structural cell systems such as those disclosed in U.S. Pat. Nos. 7,080,480 and 8,065,831, which are both hereby incorporated by reference in their entireties and for all purposes, have been designed to facilitate the growth of trees near hardscapes, while allowing for soil aeration, water drainage, and the like. It is, however, desirable to improve various aspects of such cells. Accordingly, continuing efforts exist to make such structural cells support hardscapes better, while improving the manufacturability and other characteristics of such cells.

SUMMARY OF THE INVENTION

The invention can be implemented in numerous ways. Accordingly, various embodiments of the invention are discussed below.

In one embodiment, a structural cell system for supporting hardscape and allowing tree root growth and managing stormwater underneath the hardscape comprises: a base having a plurality of receptacles and a plurality of support members interconnecting the receptacles; a plurality of legs each sized and shaped to be attachable to the base within one of the receptacles so as to extend from the base, and to be attachable to another of the legs so that pairs of legs attached to each other collectively extend from the base; and a top attachable to the legs. Outer edges of the base, the top, and the legs attached thereto define a volume, and are configured to support at least that portion of the hardscape overlying the top as well as a commercial vehicle traffic load thereon, while maintaining soil in a substantially uncompacted state throughout at least approximately ninety percent of the volume.

Outer edges of the receptacles may extend beyond outer edges of the support members.

The base and the legs may each comprise an unreinforced plastic, such as high density polyethylene (HDPE).

The base, the top, and the legs attached thereto may be sized and shaped to support a load of at least approximately 15 psi across substantially the entire top.

At least two of the receptacles may lie along a first direction, and at least two of the receptacles may lie along a second direction different from the first direction. Also, each of the legs may have a cross-sectional shape having protrusions, the protrusions arranged so that, when each of the legs is attached to a receptacle, its protrusions extend in the first and second directions.

The plurality of legs may comprise legs having a first length and legs having a second length shorter than the first length. Each pair of legs may comprise a leg having the first length and a leg having the second length.

The base may be configured so that plural ones of the bases are stackable in a vertical direction so as to be substantially coupled in a lateral direction perpendicular to the vertical direction, and so as to be substantially uncoupled in the vertical direction; and the top may be configured so that plural ones of the tops are stackable in the vertical direction so as to be substantially coupled in the lateral direction and substantially uncoupled in the vertical direction.

The system may further comprise a bioretention system positioned within the structural cell system; and tree roots extending into the bioretention system, the tree roots being from a tree positioned proximate to the structural cell system.

The base, the associated legs, and the top may collectively comprise a single structural cell, and the structural cell may have no mechanism for coupling to another one of the structural cells.

In another embodiment, a method of facilitating the growth of a tree comprises: placing a plurality of structural cells side by side and adjacent to each other, so that the structural cells are substantially uncoupled to each other and so that the structural cells substantially surround the rootball of a tree. Each structural cell may comprise: a base having a plurality of receptacles and a plurality of support members interconnecting the receptacles; a top; and a plurality of legs affixing the base to the top. Outer edges of the base, the top, and the legs affixed thereto define a volume, and are configured to support at least that portion of a hardscape overlying the top as well as a commercial vehicle traffic load thereon, while maintaining soil in a substantially uncompacted state throughout at least approximately ninety percent of the volume.

The method may further comprise filling the cells with a substantially loosely compacted soil, so as to allow roots of the tree to grow into the soil within the structural cells while simultaneously providing storage and pollutant removal of stormwater.

Each receptacle may be connected to the top by a pair of interconnected ones of the legs.

The filling the cells may further comprise filling the cells with material layers so as to form a bioretention system within the cells, each of the material layers being substantially uncompacted so as to allow roots of the tree to grow into the bioretention system within the cells.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which.

DETAILED DESCRIPTION OF EMBODIMENTS OF THE INVENTION

In one aspect, the invention relates to structural cell systems that are placed beneath hardscape. The cells are strong enough to structurally support the hardscape, effectively bearing its weight along with the weight of any load it carries. Furthermore, even though the cells are strong enough to offer structural support of a hardscape, the cells are also designed to be relatively lightweight and open, allowing approximately 90% of their volume, or more, to be free volume that can contain uncompacted soil, tree roots, utilities, and the like. Some of the components of the cell systems are stackable for better transportability. The cells achieve these attributes through a design that includes a bottom frame, attachable support members, and an attachable deck or top. The various components of the cells are designed to utilize less material relative to the cells of U.S. Pat. Nos. 7,080,480 and 8,065,831, while also being able to support the load of overlying hardscape and commercial vehicles yet being made of a more inexpensive material. Furthermore, the legs are attachable to each other so that individual cells can be made of multiple sizes, some of which are taller than the individual cells of U.S. Pat. Nos. 7,080,480 and 8,065,831. This allows a single layer of cells to take the place of multiple layers of the previous cells, thus further reducing the amount of material used.

Figure 1:
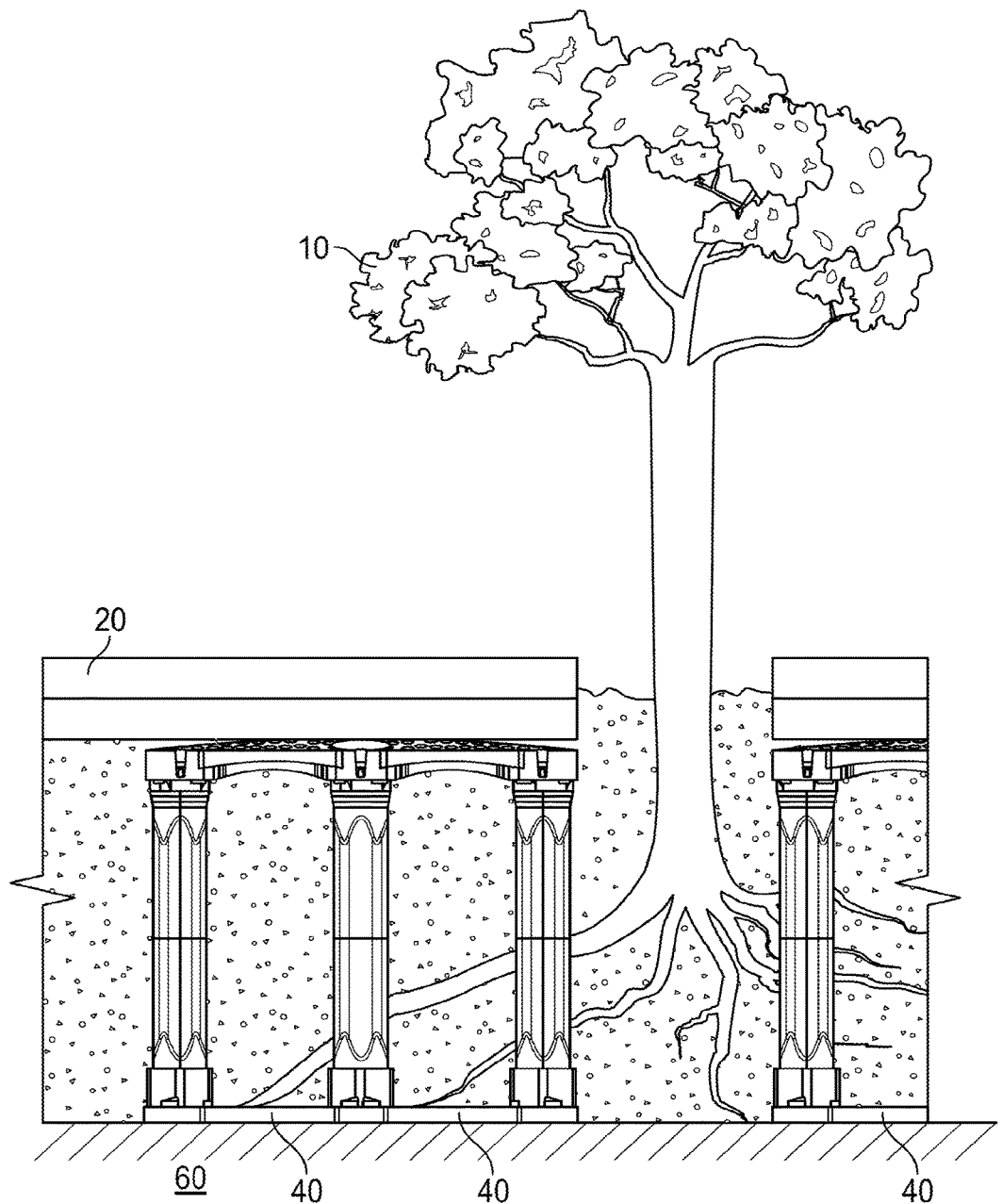
FIG. 1 illustrates operation of an exemplary structural cell system of the invention.

FIG. 1 illustrates an exemplary application of the structural cells of the invention. Here, a tree 10 grows its roots in the soil 50 underneath a hardscape 20 and layer of aggregate 30. Structural cells 40 are stacked between the hardscape 20 and aggregate 30 above, and foundation 60 below. The cells 40 are sufficiently rigid that they structurally support the weight of the hardscape 20, aggregate 30, and any loads above (e.g., cars, pedestrians, etc.), transferring it to the foundation 60 rather than the soil 50. This maintains the soil 50 within the structural cells 40 in a relatively uncompacted state, allowing roots from the tree 10 to grow therethrough as shown. In addition, the rigidity of the cells 40 allows a relatively small number of support members to bear structural loads. In this manner, the cells 40 maintain a large amount of continuous open volume within, free of excessive numbers of support members that take up space and prevent large tree roots from growing therethrough. Space is left between adjacent structural cells 40 for ease in removing/repairing individual cells 40 without disturbing the rest.

In some embodiments, the structural cells 40 are configured to satisfy a number of constraints. For example, the cells 40 should be composed of a material capable of withstanding an underground environment that can contain water. This material should also be of sufficient strength to support a hardscape 20, aggregate 30, and their associated loads. In some embodiments, it is preferable for the cells 40 to support loads in accordance with known AASHTO (American Association of State Highway and Transportation Officials) H-20 load requirements. In addition, the cells 40 are to be configured to be stackable side by side, as shown in FIG. 1, without interlocking or coupling together. That is, while adjacent cells 40 may contact each other and thus be subject to frictional forces therebetween, they are not otherwise coupled to each other. For example, adjacent cells 40 are not attached to each other, and cells 40 do not contain any features allowing them to be connected to any other cells 40. In this manner, cells 40 can be relatively easily removed in the event that any features below or within them, such as utilities, service lines, or the like, must be accessed for maintenance or repair. Leaving cells 40 unconnected to each other also acts to localize the failures of any individual cells 40, so that the failure of one cell 40 does not compromise any other cells 40, and the failed cell 40 can be relatively easily replaced by simply removing it and adding another in its place. Finally, the various component parts of cells 40 may be designed to be injection-moldable, although embodiments of the invention contemplate any method of fabricating any part of the cells 40.

Figure 2A:
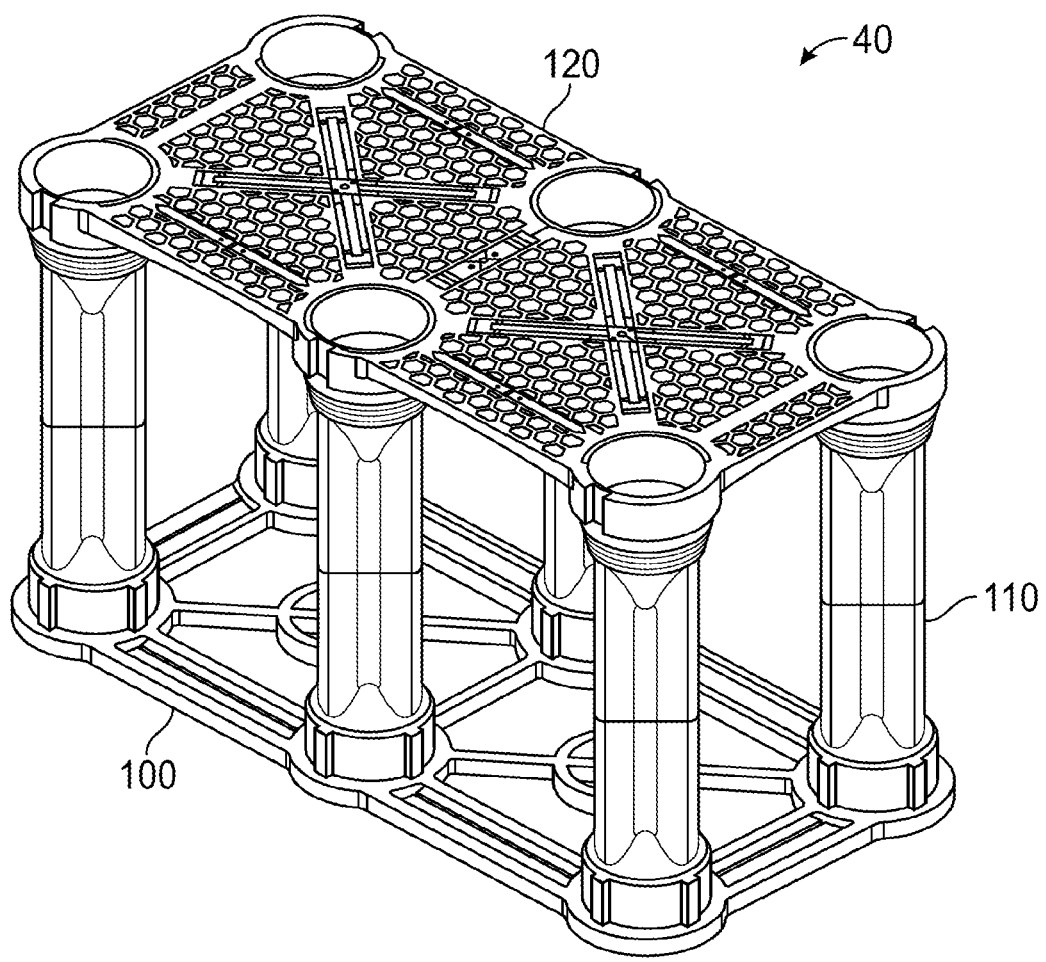
FIG. 2A illustrates an isometric detail view of an assembled structural cell of the invention.

These constraints are satisfied by the structural cell design of FIG. 2A, which illustrates further details of the structural cells 40 of FIG. 1. In FIG. 2A, the structural cell 40 has a base or lower portion 100, legs or vertical supports 110, and a top, deck, or upper portion 120. The base 100, legs 110, and deck 120 are fabricated separately and assembled to form the cell 40 shown.

In the embodiment shown, the assembled cell 40 is generally rectangular, with three support members 110 along each of its longer sides for a total of six vertical supports 110. More specifically, a vertical support 110 is located at each corner of the cell 40, with two additional vertical supports 110 located inbetween. The lower frame 100 is also relatively thin and therefore pliable to a degree, so as to conform to small irregularities in the foundation 60. It can be observed that the cell 40 leaves the volume within largely unobstructed, i.e., free of excessive numbers of support members, allowing large roots and other large-sized objects to be placed within. This yields significant advantages, as cells 40 not only contain relatively large amounts of open space, but this open space is also easily accessible for penetration by roots (such as those of tree 10) or other objects. Thus, not only is space available for roots and other objects, but they can also grow into, or be placed within, the cells in a relatively unimpeded fashion. Cells 40 can thus be used in connection with even very large trees with large root systems, as the cells 40 offer very little in the way of obstructions to impede the growth of even large roots therethrough. This creates cells 40 with relatively large open structures that can be easily accessed and thus, for example, are easily filled with soil, in contrast to cells with excessive numbers of support members that inhibit the placement of soil or other objects within.

Figure 2B:
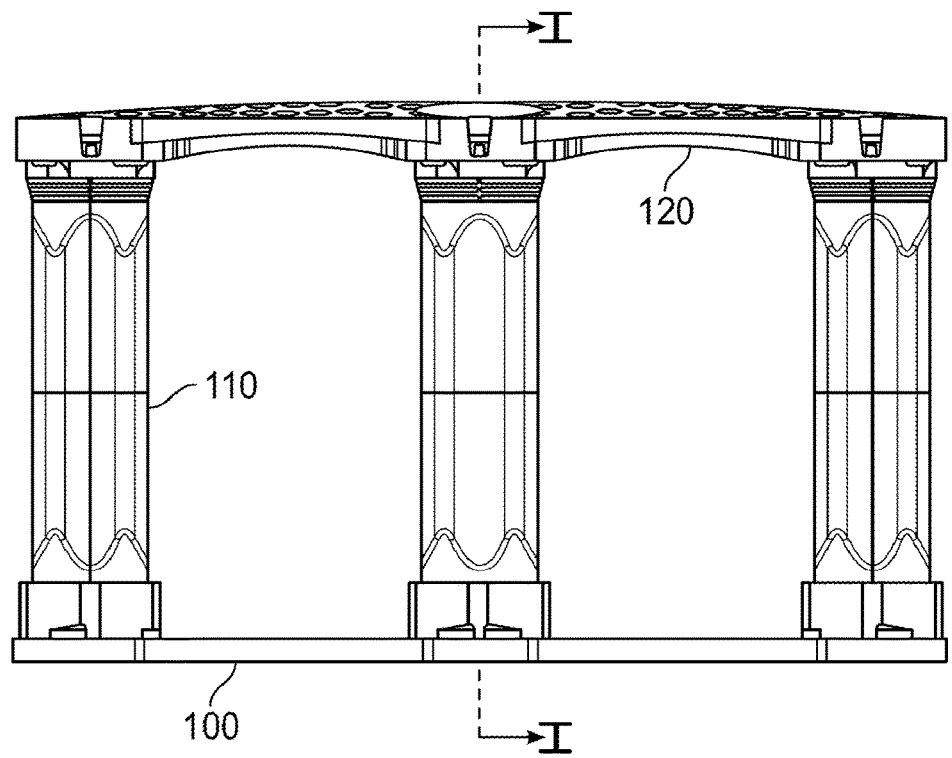
FIG. 2B is a side view of the assembled structural cell of FIG. 2A.
Figure 2C:
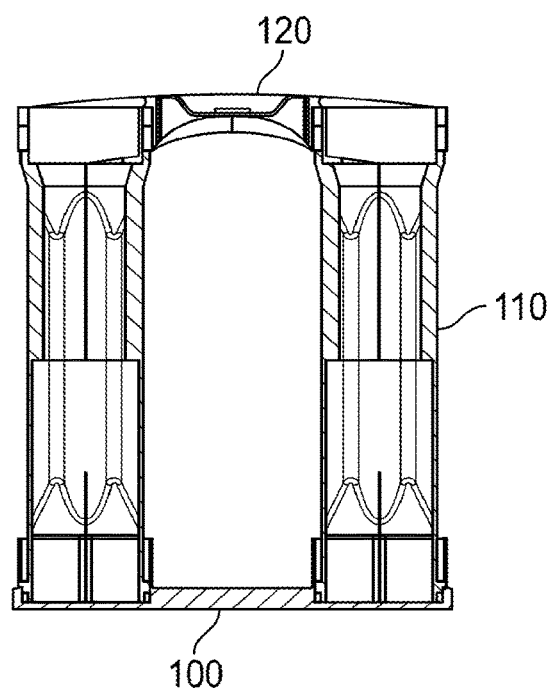
FIG. 2C is a cross-section view taken along line I-I' of FIG. 2B.

As can be seen in FIGS. 2B and 2C, each cell 40 has two rows of three legs 110 each, with three legs 110 positioned evenly along each longer side of cell 40, and two legs 110 positioned at each end of each shorter side of cell 40. As will be described further below, bottom ends of the legs 110 are inserted into recesses in the base 100, and the deck 120 is applied to the top ends of the legs 110.

Figure 3A:
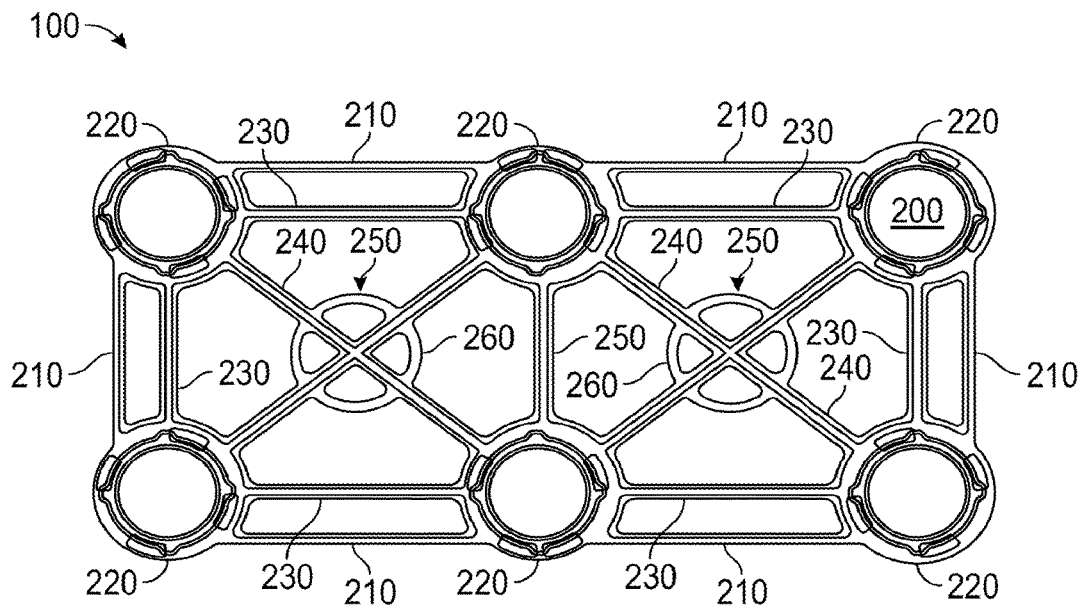
FIG. 3A is a plan view of the base of the structural cell of FIG. 2A.
Figure 3B:
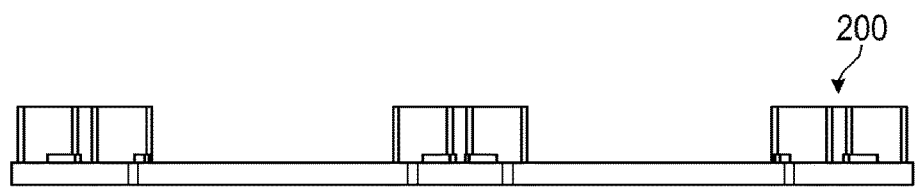
FIGS. 3B and 3C are side views of the base of FIG. 3A.
Figure 3C:

FIGS. 3A-3C illustrate further details of the base 100. In this embodiment, the base 100 is a rectangular framelike structure with six recesses 200 interconnected by outer longitudinal supports 210 and inner longitudinal supports 230, although any size and shape of base 100 is contemplated. The recesses 200 are each sized and shaped to accommodate a leg 110, which can turn and lock into its recess 200. Outer edges of the outer longitudinal supports 210 collectively form a perimeter around the base 100, with inner longitudinal supports 230 also connecting adjacent recesses 200 while being located inside, and spaced apart from, outer longitudinal supports 210. Outer edges 220 of recesses 200 protrude beyond the perimeter formed by the outer edges of the outer longitudinal supports 210. That is, the recesses 200 are positioned to at least partially extend beyond the outer edges of outer longitudinal supports 210.

The base 100 also has crossbars 240 connecting diagonally-adjacent pairs of recesses 200. That is, crossbars 240 connect recesses 200 at the corners of base 100 to recesses 200 located at the middle of the longer sides of base 100. Pairs of crossbars 240 intersect, and footpads 250 are placed at their intersections. Footpads 250 are formed by placing curved supports 260 at the intersections of pairs of crossbars 240, and can be used by workers when constructing the assemblies of cells 40 shown in FIG. 1. For example, footpads 250 allow workers safe places to step when the bases 100 are already placed below ground, so that the workers do not step on other more fragile parts of cells 40. The footpads 250 are shown as circular and are sized to support a human foot in a work boot, although various embodiments contemplate any size and shape for the footpad 250. Crossbar 250 is also located between the two recesses 200 placed at the middle of the longer sides of the base 100, so as to add extra support in the vertical direction of FIG. 3A.

It should be noted that the configuration of FIG. 3A yields significant savings in material over conventional structural cell bases. For example, as noted previously, the outer longitudinal supports 210 are set inward from the outer edges 220 of recesses 200, resulting in less material used as compared to conventional structural cells whose outer supports extend parallel to their recesses (making them longer and thus using more material), while still maintaining structural integrity. Also, the present embodiment utilizes two supports 210, 230 separated by a space inbetween, rather than a single wider, solid support. This also results in material savings. Likewise, the footpads 250 are configured as relatively thin outer curved supports 260 surrounding empty space, save for that portion of crossbars 240 extending within. The significant amount of empty space thus also provides a footpad made from a relatively small amount of material.

The legs or vertical supports 110 are not limited to the length shown in FIG. 2A, but instead can be any length. In particular, one embodiment of the invention contemplates legs of two different lengths. In this manner, cells of at least three different heights can be made: a shorter cell with short legs, a medium-height cell with the longer legs, and a tall cell with each vertical support made of a longer leg connected to a shorter leg. This allows for the flexibility to make cells of different heights, so that the same component parts can be used to assemble cells suitable for many different applications.

Figure 4A:
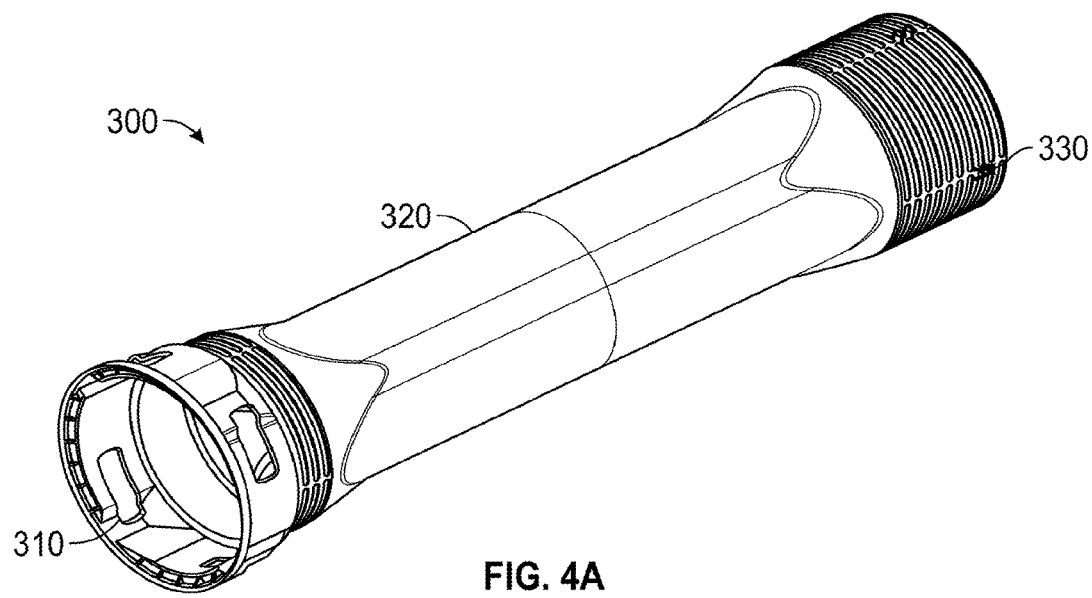
FIG. 4A is an isometric view of one embodiment of a leg of the structural cell of FIG. 2A, where in this embodiment the leg is a longer leg.
Figure 4B:
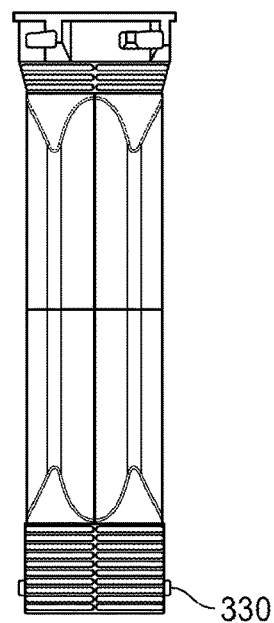
FIG. 4B is a side view of the leg of FIG. 4A.
Figure 4C:
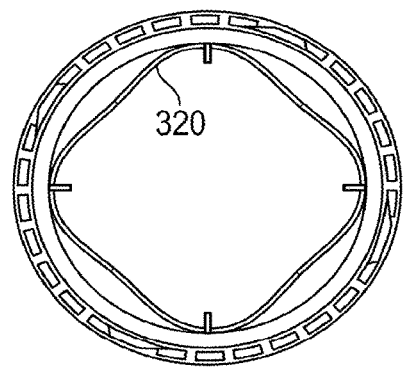
FIG. 4C is a cross-section view of a center portion of the leg of FIG. 4A.

FIGS. 4A-4C illustrate further details of a longer leg. Here, longer leg 300 includes ends with features 310 and 330 for connection to the base 100 and top/another leg respectively, as well as a central portion with longitudinal protrusions 320. The features 310, 330 are features allowing for turn and lock connection to the base 100 and top/other leg. For example, the features 310, 330 can be slots and a corresponding pin or other extension sized to fit into the slot so that turning the leg secures the pin in the slot. The features 310, 330 are configured to allow turn and lock connection to both the base 100 and another leg or the top 120. For instance, the lower end of leg 300 has slots as features 310, while the upper end of leg 300 has pins or extensions as features 330, while the recesses 200 have pins or extensions, and the corresponding portions of the top 120 have snap fit joints. This allows the leg 300 to be turned and locked into place within a recess 200 of base 100, whereupon either the lower end of another leg can be turned and locked onto the upper end of leg 300, or the top 120 can be snapped into place on the upper end of leg 300. If another leg is attached to the upper end of leg 300, the top 120 is snapped onto the upper end of that added leg.

The longitudinal protrusions 320 extend outward, adding to the radius of the leg 300 and thus improving the strength of the leg 300. In particular, the protrusions 300 improve the bending stiffness and buckling strength of the leg 300, as would be understood by one of ordinary skill in the art. The protrusions 320 can be oriented so that the center of each protrusion 320, i.e. the point of maximum height or distance from the central axis of leg 300, is oriented parallel to one of the sides of base 100, i.e. in FIG. 3A, a line drawn through the centers of two opposing protrusions 320 of a leg 300 is oriented either horizontally or vertically, along either the longer side or the shorter side of the leg 300. It has been found that this orientation provides desirable resistance to buckling. However, it should be noted that any number and orientation of protrusions 300 is contemplated. Also, the protrusions 320 can be of any cross-sectional shape. The shape of each protrusion 320 is not limited to the curved or domelike cross-sectional shape shown in FIG. 4C, but can be any cross-sectional shape that improves the strength of its leg 300.

Figure 5A:
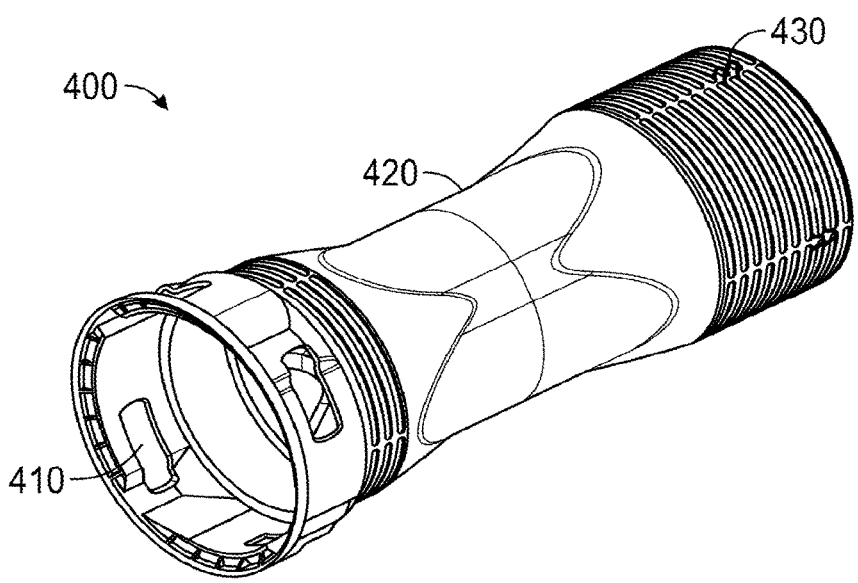
FIG. 5A is an isometric view of another embodiment of the leg of the structural cell of FIG. 2A, where in this embodiment the leg is a shorter leg.
Figure 5B:
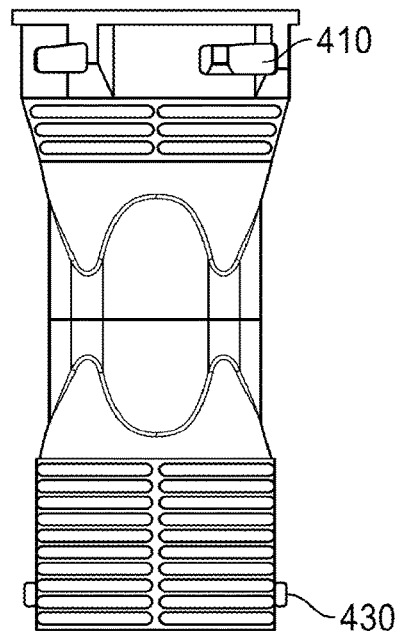
FIG. 5B is a side view of the leg of FIG. 5A.
Figure 5C:
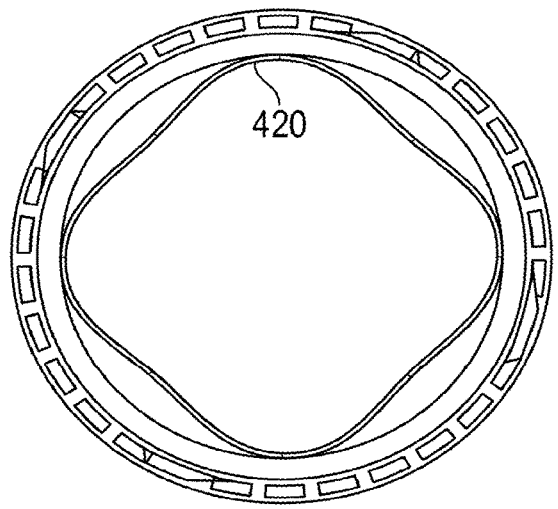
FIG. 5C is a cross-section view of a center portion of the leg of FIG. 5A.

FIGS. 5A-5C illustrate further details of a shorter leg. Similar to the longer leg 300, shorter leg 400 has features 410, 430 that are similar to the respective features 310, 330 of longer leg 300. That is, features 410, 430 can be slots and pins/extensions respectively, which allow the shorter leg 400 to lock within recesses 200 of base 100, and to be snapped onto the top 120. Also, longitudinal protrusions 420 are shaped, and act, similar to protrusions 320 of leg 300, increasing bending stiffness and buckling resistance.

As noted above, cells 40 can utilize only the longer legs 300, only the shorter legs 400, a longer leg 300 combined with a shorter leg 400, or a shorter leg 400 combined with another shorter leg 400. This allows for cells 40 of at least four different heights.

Figure 6A:
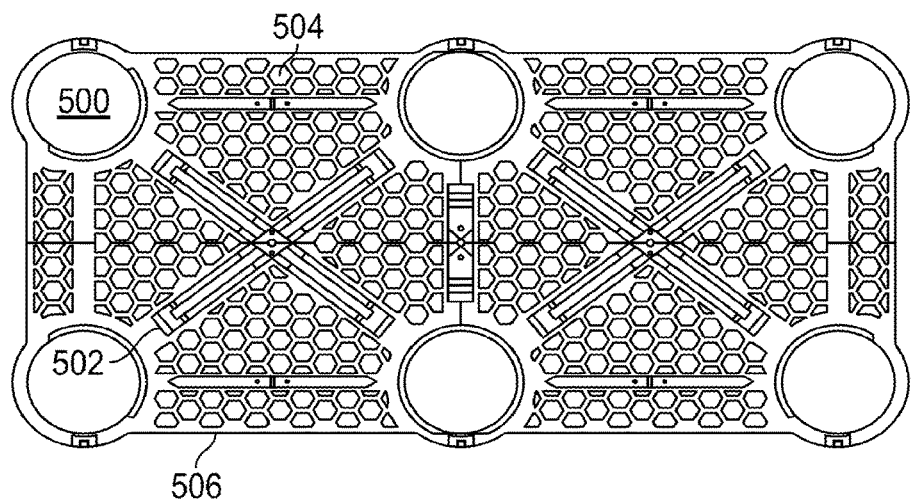
FIG. 6A is a plan view of the deck of the structural cell of FIG. 2A.
Figure 6B:
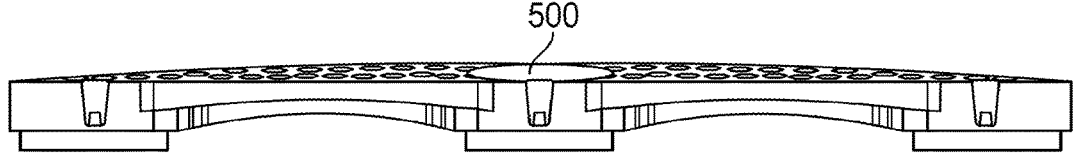
FIGS. 6B and 6C are side views of the deck of FIG. 6A.
Figure 6C:
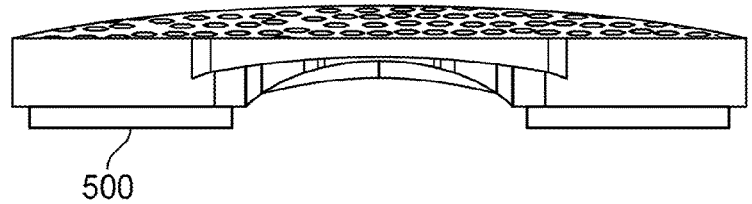

FIGS. 6A-6C illustrate the top or deck 120 in further detail. Here, deck 120 has recesses 500 corresponding in number and location to the recesses 200 of base 100. That is, the deck 120 has six recesses 500 arranged in rectangular manner, with two rows of three recesses 500. The deck 120 has a rectangular shape, with recesses 500 located at each corner and two recesses 500 located at the midpoints of each longer side, where the outer edges of recesses 500 each protrude beyond the sides 506 of deck 120. However, the deck 120 is not limited to this configuration, and may have any shape, and any number or position of recesses 500, so long as the recesses 500 are positioned to vertically align with the recesses 200 of base 100. Indeed, the deck 120 need not be rectangular in shape, and need not be of the same general shape as that of the base 100, even though the base 100 and deck 120 are shown as each having a rectangular shape in the present embodiment. The recesses 500 are holes that extend through the deck 120, and contain features allowing for snap fit (or other suitable attachment) to legs 300, 400.

The deck 120 also has stiffeners 502 arranged in diagonal manner between recesses 500, as shown. The stiffeners 502 are bar- or beam-shaped structures placed within channels formed in the deck 120, and connected to the deck 120 at their ends. The stiffeners 502 can be made of the same material as the deck 120, or may be made of a stronger material such as a steel. The stiffeners 502 can be integrally formed with the deck 120 or may be separate members attached to the deck 120. Connection to the deck 120 can be made in any manner, such as by forming the stiffeners 502 integrally with the deck 120, snap fitting the stiffeners 502 within appropriate features formed in the deck 120, attaching the deck 120 and stiffeners 502 to pins that secure the deck 120 to the stiffeners 502, or the like. Any connection method or apparatus is contemplated. The stiffeners 502 add to the strength and bending stiffness of the deck 120. The body of the deck 120 is formed of a honeycomb structure 504 for sufficient strength while saving weight and material. It is contemplated that the cells 40 will often be filled with soil first, then the deck 120 attached. However, and in the alternative, hexagonal holes of the honeycomb structure 504 are sized to allow soil to relatively easily fall through the deck 120 and into the space within the cell 40, allowing for the cells 40 to be filled with soil after the deck 120 is attached. For example, in one embodiment, the hexagonal holes measure 30 mm across the diagonal, and 27.3 mm across the flats. In this manner, the cell 40 can be easily filled with soil even after it is fully assembled, by simply pouring soil on top of the deck 120 and allowing it to fall through the hexagonal holes and into the cell 40 (or perhaps working the soil slightly to allow it to fall through the deck 120). The hexagonal holes are not limited to this particular shape however, and embodiments of the invention contemplate any sizes and arrangements of holes that allow soil to readily fall therethrough.

Embodiments of the deck 120 also have arched shapes, to better support loads. For example, the upper and lower surfaces of deck 120 are slightly curved or arched, as shown in FIGS. 6B and 6C. More specifically, the upper surface has an arch or curve that extends across the entire deck 120, with lowest points at the two opposing shorter sides of the deck 120 and a highest point in the middle. Similarly, the lower surfaces are also curved or arched between adjacent recesses 500, with each curve or arch having lowest points at or near two adjacent recesses 500, and highest points inbetween. Other embodiments need not include these arches or curved surfaces, or may include only some of them. Likewise, the degree or amount by which each surface is arched may vary to any degree that allows the deck 120 to facilitate maintenance of root growth medium within cells 40 in a substantially uncompacted state.

Figure 7A:
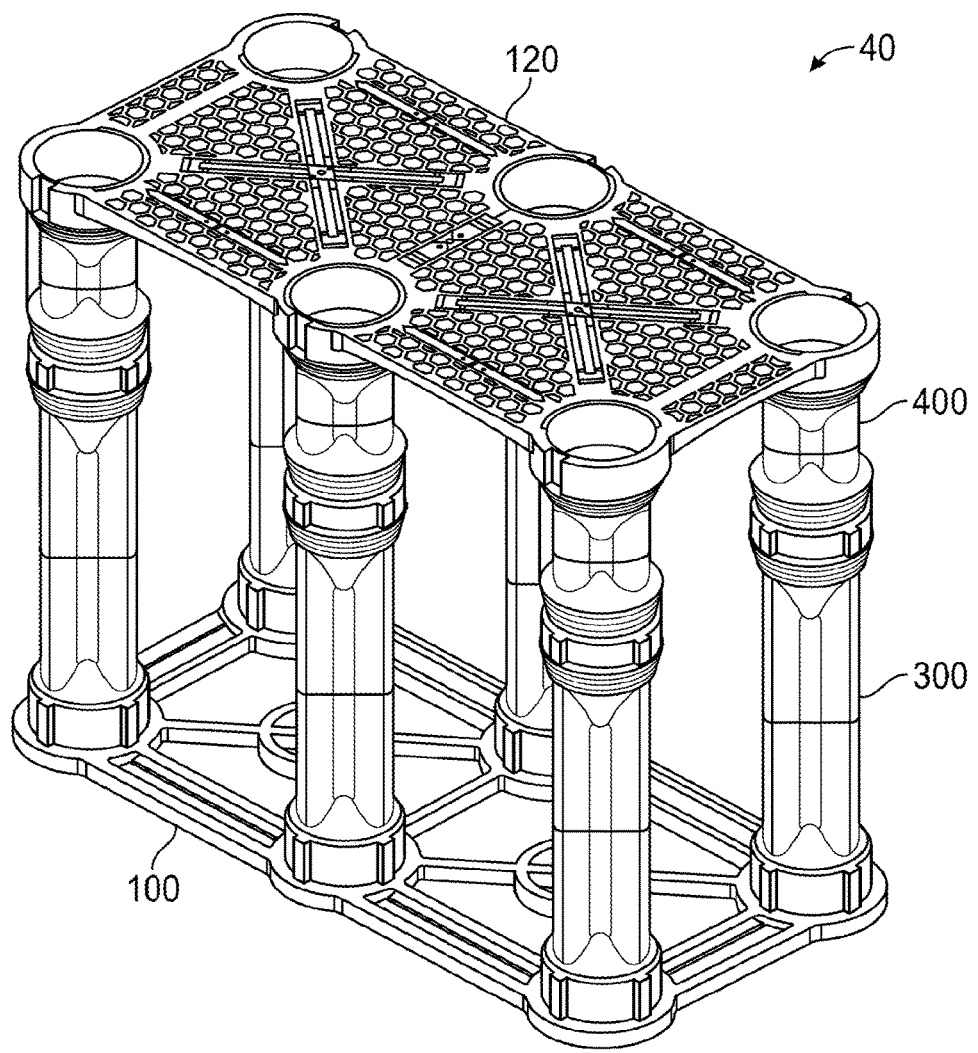
FIG. 7A is an isometric detail view of an assembled structural cell, using both longer legs and shorter legs.
Figure 7B:
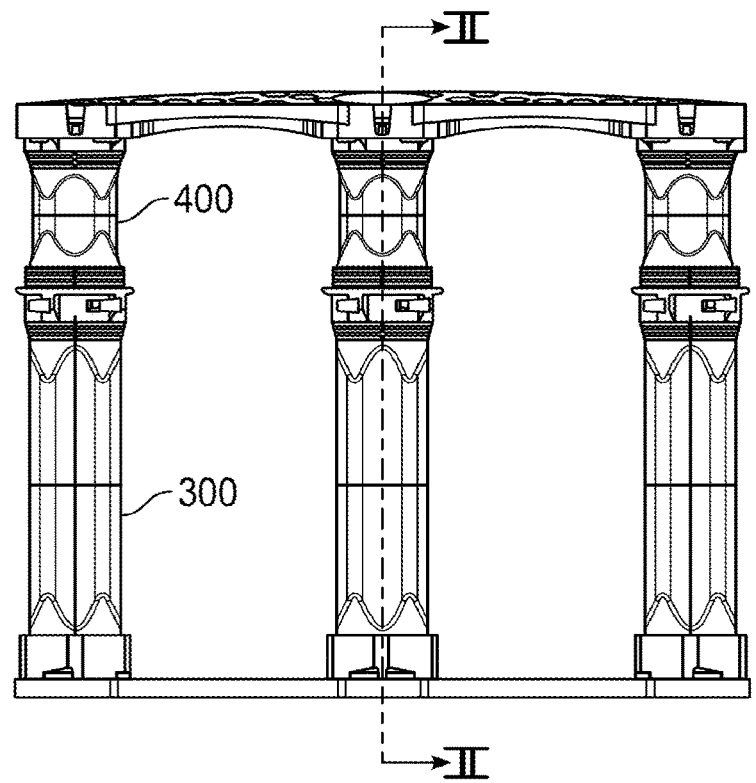
FIG. 7B is a side view of the structural cell of FIG. 7A.
Figure 7C:
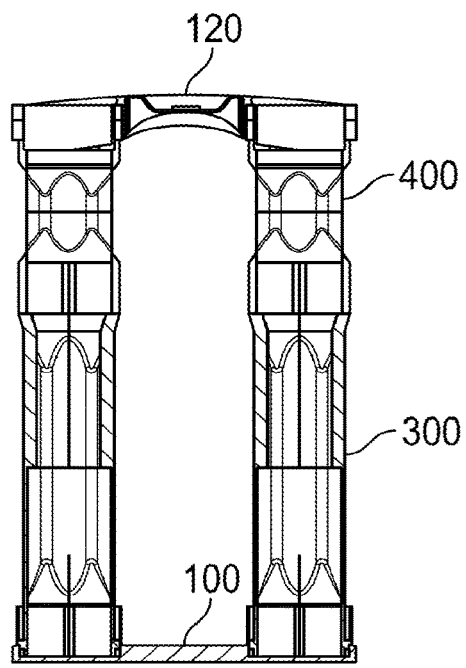
FIG. 7C is a cross-section view taken along line II-II' of FIG. 7B.
Figure 8A:
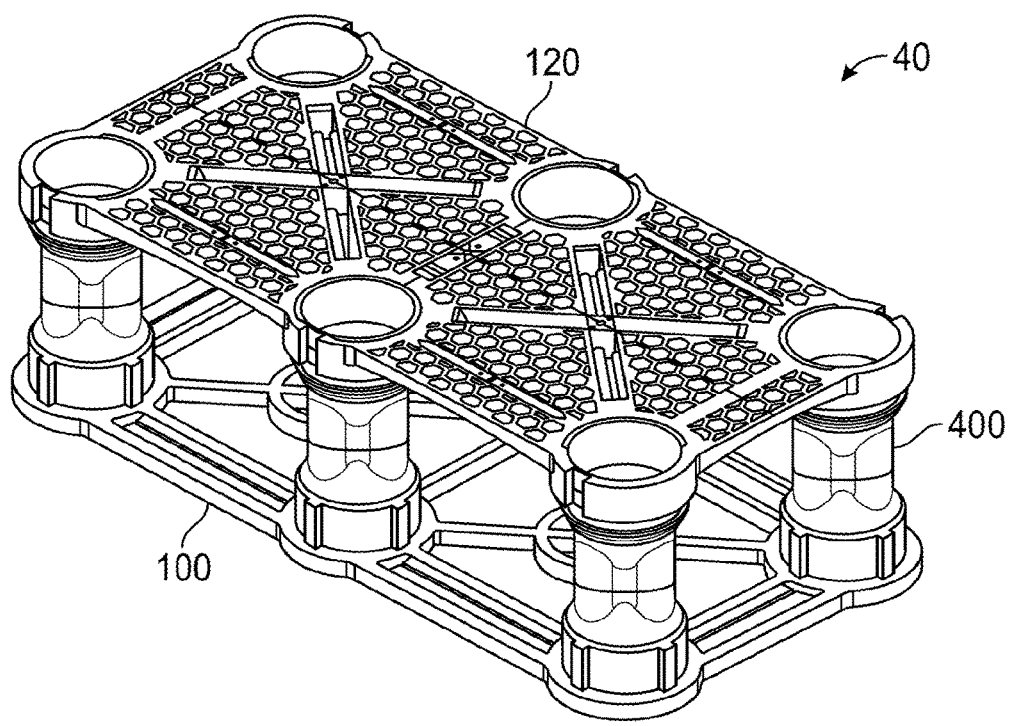
FIG. 8A is an isometric detail view of an assembled structural cell, using only shorter legs.
Figure 8B:
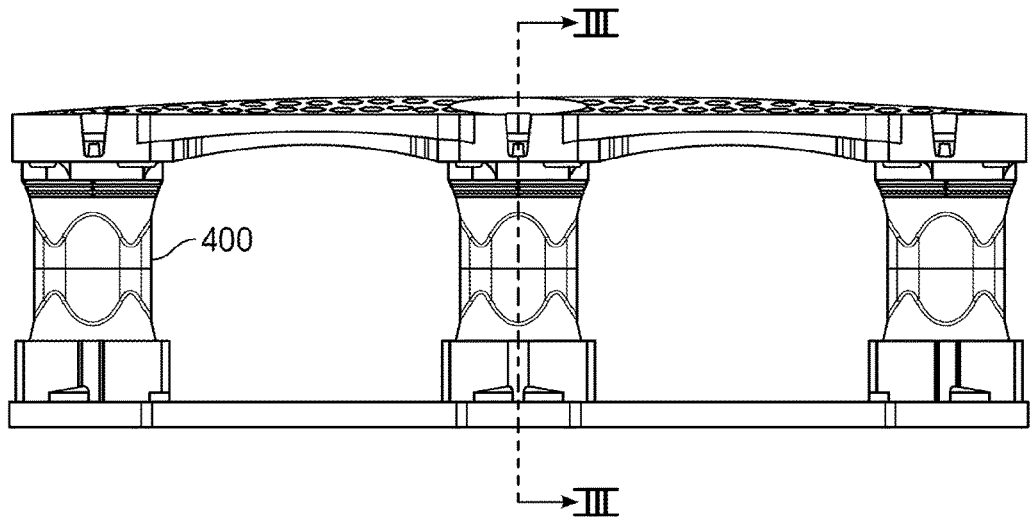
FIG. 8B is a side view of the structural cell of FIG. 8A.
Figure 8C:
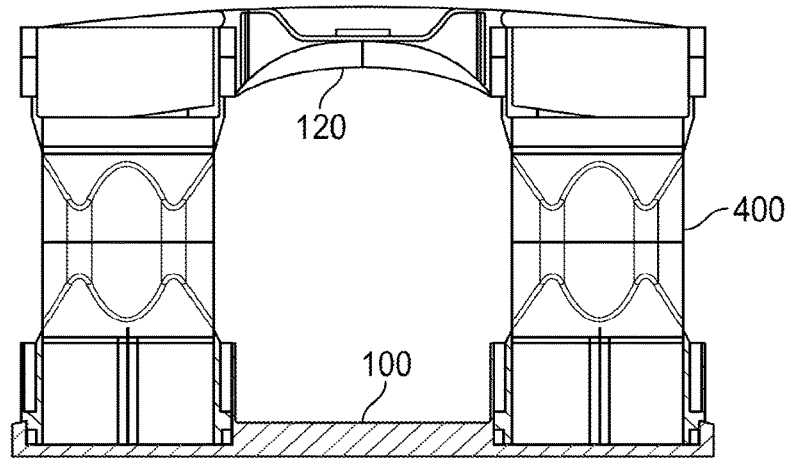
FIG. 8C is a cross-section view taken along line III-III' of FIG. 8B.

As described above, the cells 40 are modular and designed to be used with legs of multiple lengths, allowing for cells 40 of multiple heights for use in many different applications. FIGS. 2A-2C, as already described, illustrate a cell 40 constructed using a single set of longer legs 300. Meanwhile, FIGS. 7A-7C illustrate a cell 40 constructed so that each vertical support is made up of a longer leg 300 and a shorter leg 400 connected to each other, and FIGS. 8A-8C illustrate a cell 40 constructed using a single set of shorter legs 400. The cells 40 of FIGS. 2A-2C may be used in applications where an intermediate-sized cell 40 is desired, such as, for example, when an intermediate amount of uncompacted soil is desired, or when the particular site is sized so that it can only accommodate intermediate-sized cells 40.

In FIGS. 7A-7C, each recess 200 has a longer leg 300 attached thereto, as above via a turn and lock mechanism or any other suitable mechanism. Attached to each longer leg 300 is a shorter leg 400, again attached via a turn and lock mechanism or any other suitable mechanism. The shorter legs 400 are then attached to recesses 500 of the deck 120, via snap fit or other appropriate mechanisms. The cells 40 of FIGS. 7A-7C thus employ both a longer leg 300 and a shorter leg 400 for each vertical support, and are therefore taller than those of FIGS. 2A-2C which employ only a single longer leg 300. Accordingly, the cells 40 of FIGS. 7A-7C may be used in connection with larger sites that can accommodate larger cells 40, when a large amount of uncompacted soil is desired, more stormwater is desired to be retained, or the like.

In FIGS. 8A-8C, each recess 200 has only a shorter leg 400 attached thereto, again via a turn and lock mechanism or any other suitable mechanism. The shorter legs 400 are then attached to recesses 500 of the deck 120, via snap fit or other appropriate mechanisms. The cells 40 of FIGS. 8A-8C thus employ only a single shorter leg 400 for each vertical support, and are therefore shorter than those of FIGS. 2A-2C. Accordingly, the cells 40 of FIGS. 8A-8C may be used in connection with smaller sites that can only accommodate these smaller cells 40, when a relatively small amount of uncompacted soil is desired, less stormwater is desired to be retained, or the like.

In operation, a foundation 60, which is typically impermeable to tree roots, can be formed. Often, the foundation 60 is soil which has been compacted to at least 95% proctor to serve as an underlying foundation for construction, as is known. However, the foundation 60 can be any other layer that is highly resistant or effectively impermeable to tree roots, such as bedrock, concrete, aggregate, or the like. Then, a number of cells 40 are assembled and placed side by side around the rootball of a tree 10, as shown in FIG. 1. The tree 10 may already be present, or the cells 40 may be arranged with a gap inbetween, and the rootball of a tree 10 may be inserted into the gap. The number of cells 40 used is preferably sufficient to provide enough volume of uncompacted soil to allow the roots of tree 10 to grow to their full natural capacity, although any number is contemplated. The cells 40 are not connected to each other. Rather, they are simply placed side by side, and not coupled to each other. Indeed, it can be seen that the individual cells 40 have no mechanism by which they can be attached or otherwise coupled to each other.

The spacing between cells 40 may range. For example, depending on the application desired, adjacent cells 40 may be immediately adjacent to each other, and perhaps even contacting (touching but not otherwise coupled to) each other. At the other extreme, adjacent cells 40 may be placed several inches or more apart from each other. Any intermediate positions are also contemplated. As one nonlimiting example, adjacent cells 40 may be placed from 0 to 5 inches apart from each other. As above, this helps prevent the failure of one cell 40 from compromising its adjacent cells 40, and also allows for easier repair of underlying utilities, service lines, or anything else placed within or under the cells 40.

Next, soil or any other tree root growth medium is poured into the cells 40 and evenly spread therethrough, after which the decks 120 are placed over the cells. In this manner, the cells 40 are filled with substantially uncompacted, or loosely compacted, soil. It may also be possible to attach the decks 120 first then pour soil/growth medium over the decks 120, where it falls through (or can be readily manipulated so as to fall through) the holes in the decks 120 to fill the empty space within each cell 40.

Subsequently, a geotextile layer is typically placed upon the decks 120, and the aggregate 30 and hardscape 20 are poured upon the geotextile layer. The weight of the aggregate 30 and hardscape 20 then acts to push the geotextile layer partially into the depressions 300. This acts to secure the deck 120 and cells 40 against any lateral movement, adding to the structural stability of the cells 40. Stability is further aided by the soil 50, which also supports the cells 100 against any lateral movement.

In the resulting configuration, one of ordinary skill in the art will observe that the cells 40 support the weight of their overlying aggregate 30, hardscape 20, and any traffic (foot or vehicle) that passes thereover. As the cells 40 support this weight, the tree growth medium is left substantially uncompacted, supporting only its own weight. Accordingly, the rootball of tree 10 is surrounded with a significant volume of substantially loosely compacted soil, which allows the roots of tree 10 to grow therethrough, providing space and a suitable medium for the roots to grow to their full natural size relatively unencumbered. This is in contrast to many conventional urban tree growth sites, which are surrounded by hardscape such as concrete roads and sidewalks that require their underlying earth to be packed so densely and solidly to support the hardscape, that tree roots cannot grow therethrough, thus stunting their growth as well as that of the tree. Thus, embodiments of the invention allow for growth of large trees in areas where they could not be grown before, in particular dense urban areas containing significant hardscape covering. This also allows for much more stormwater retention in these areas, which is a significant advantage over conventional dense urban areas, whose hardscape covering typically converts most stormwater to relatively useless runoff that also contributes to problems such as flooding and the like. Instead of simply producing runoff, embodiments of the invention retain stormwater, using it to water trees and provide other benefits, while also reducing the problems commonly associated with runoff, such as flooding.

Retention of stormwater also provides further benefits, such as pollutant removal and cleaning of runoff water. More specifically, both the loosely compacted soil and tree roots clean and/or filter water that they capture. Accordingly, instead of simply producing runoff that becomes contaminated as it picks up impurities and chemicals from the ground, embodiments of the invention retain and clean stormwater so that it can be used in tree or plant growth, etc.

In terms of specific numbers, since the cells 40 support substantially the entire weight of overlying hardscape, aggregate, and commercial traffic, the soil or root growth medium does not experience any compressive force except that of its own weight. Accordingly, the cells 40 can maintain the soil or root growth medium in an uncompacted state, e.g., at approximately 80% proctor or less (roughly corresponding to compaction by human foot, or less). In contrast, the hard-packed soil created by general construction is typically 90-95% proctor or so, which is known to be effectively impenetrable to tree roots. Trees planted in typical construction sites, such as under pavement supported by hard-packed soil, commonly only have a small area in which to grow roots (usually a small volume dug out from the hard-packed soil of a construction area), resulting in a stunted root system and a smaller, less healthy tree. In contrast, the cells 40 of embodiments of the invention allow for large areas of substantially uncompacted, or loosely compacted, soil to exist even under or next to construction sites and other areas of hard-packed soil, resulting in growth of large, healthy trees even in areas that could not conventionally support such trees, like dense urban areas covered by concrete or asphalt.

As above, such cells 40 are largely open, indeed having up to 90% or more of their volume being free volume available to be taken up by root growth. The significant amount of open area within cells 40 also allows for other structures to extend therethrough. For example, water pipes, electrical or other lines may be run into or through the cells 40, so that utilities need not be routed around any system of cells 40.

Figure 9A:
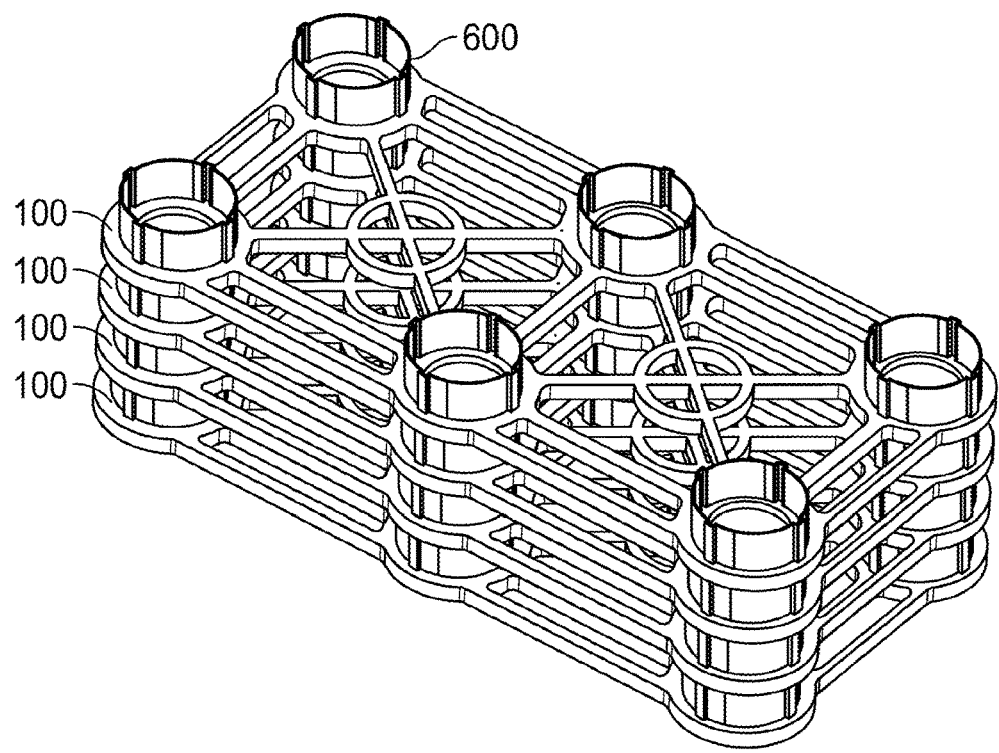
FIG. 9A is an isometric detail view of stacked bases constructed in accordance with embodiments of the present invention.
Figure 9B:
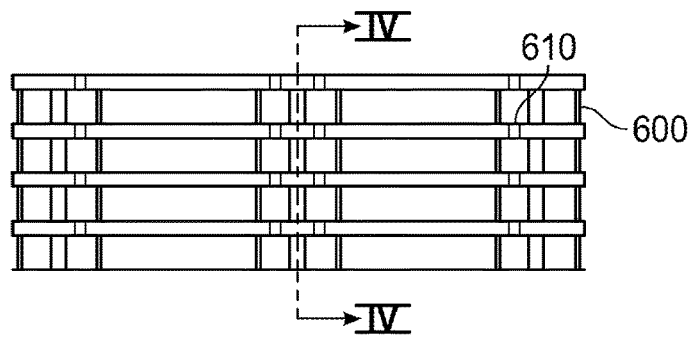
FIG. 9B is a side view of the stacked bases of FIG. 9A.
Figure 9C:
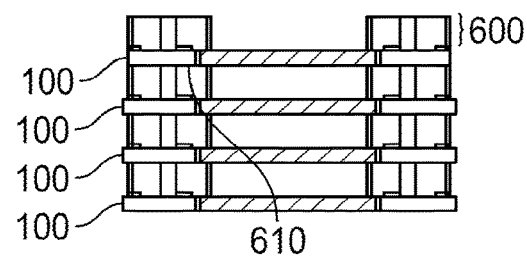
FIG. 9C is a cross-section view taken along line IV-IV' of FIG. 9B.

Attention now turns to further features of the cells 40 of embodiments of the invention. In some though not all applications, it is desirable for the bases 100 and decks 120 to be stackable upon each other, so that the bases 100 and decks 120 can be more readily and more efficiently transported. FIGS. 9A-9C illustrate stacked bases 100 configured according to an embodiment of the present invention. Here, the recesses 200 of each base 100 have rims 600 extending upward, out of the main body of their base 100. The rims 600 can extend upward to any distance (i.e. each can have any height), but in one embodiment can be sized to provide protection to the joints between their recesses 200 and legs 300/400, as well as provide sufficient clearance between stacked bases 100, without providing excessively large clearance between stacked bases 100 and thus reducing the efficiency and compactness with which they can be stacked.

Each recess 200 can also have a corresponding circular depression or opening 610 formed on the other side of the base 100 as the rim 600, and sized to hold the rim 600 of another base 100. In this manner, the rims 600 of one base 100 may engage with the openings 610 of another base 100 that is stacked on top, holding it securely in place. Thus, stacked bases 100 can be coupled together in lateral directions (i.e. kept from sliding laterally off of each other, and thus remaining stacked), but substantially uncoupled in the vertical direction. That is, the base 100 at the top of the stack is kept from sliding laterally off of the stack, but is free to be removed from the stack simply by lifting it off.

The recesses 200 may or may not be present, and the invention includes embodiments in which they are, as well as embodiments in which they are not. In high loading situations where recesses 200 are desired, the recesses 200 and surrounding material of the base 100 may be reinforced, such as by thickening the walls of these structures, adding reinforcement, or the like.

Figure 10A:
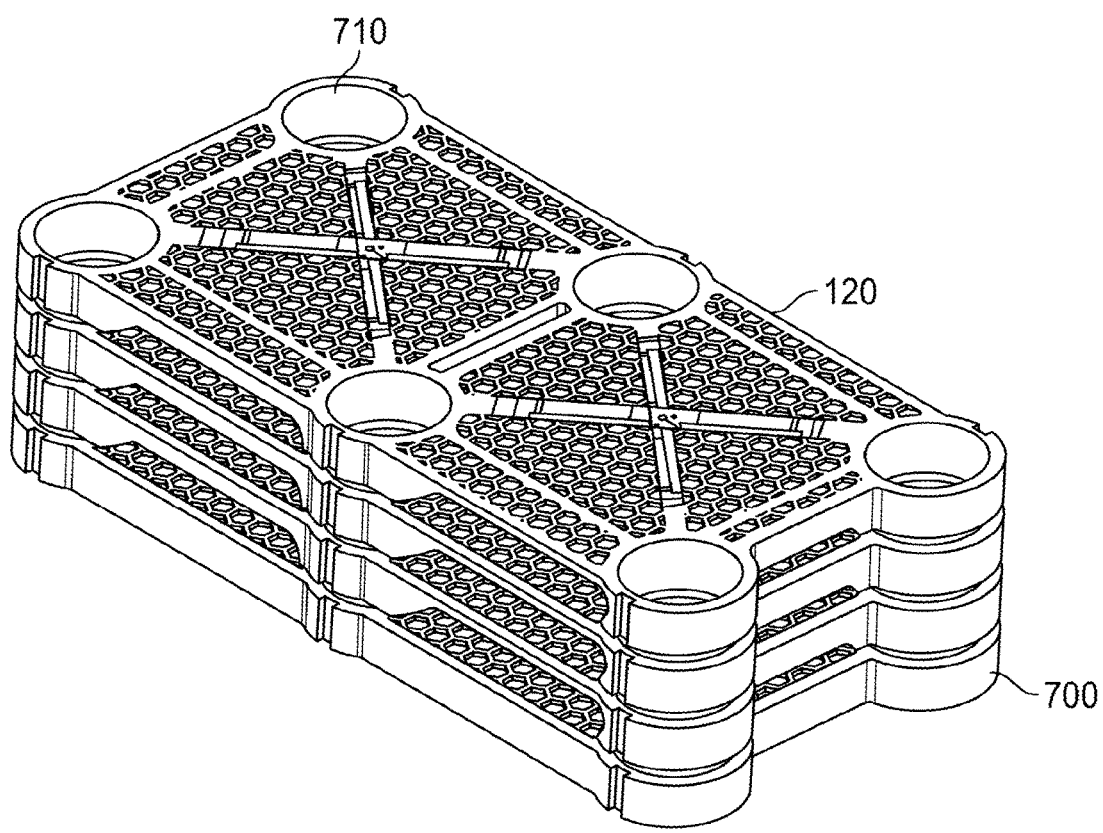
FIG. 10A is an isometric detail view of stacked decks constructed in accordance with embodiments of the present invention.
Figure 10B:
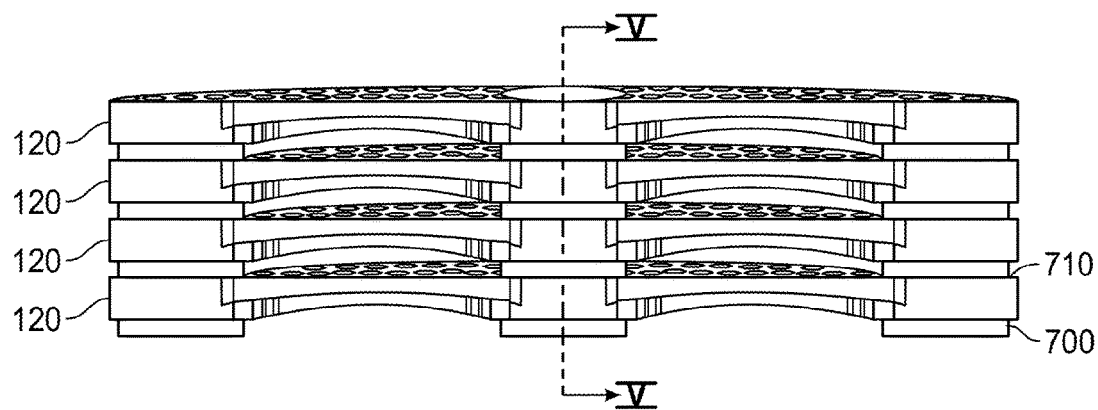
FIG. 10B is a side view of the stacked decks of FIG. 10A.
Figure 10C:
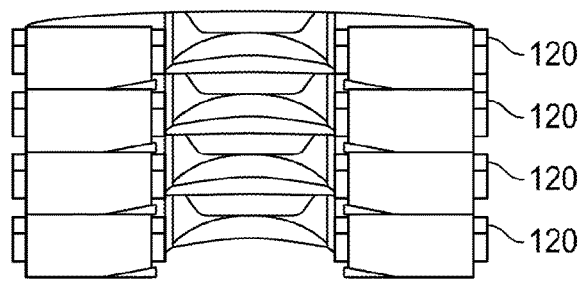
FIG. 10C is a cross-section view taken along line V-V' of FIG. 10B. Like reference numerals refer to corresponding parts throughout the drawings. The various Figures are not necessarily to scale.

Embodiments of the present invention may also include stackable decks 120. FIGS. 10A-10C illustrate stacked decks 120 configured according to an embodiment of the present invention. Here, the recesses 500 have rims 700 extending downward, away from the main body of their deck 120. The rims 700 can extend downward any distance, i.e. each can have any length, but in one embodiment can be sized to provide protection for the joints between recesses 500 and the tops of legs 300/400, as well as provide sufficient clearance between stacked decks 120. Conversely, the rims 700 are made short enough to avoid excessively large clearance between stacked decks 120, which would reduce the efficiency and compactness with which they can be stacked.

Each recess 500 can also have a corresponding circular depression or opening 710 formed on the upper surface of the deck 120 (i.e. on the other side of the deck 120 as the rim 700). The rims 700 of one deck 120 may thus engage with the openings 710 of another deck 120 that is stacked below, thus holding it securely in place. Like the bases 100, the decks 120 when stacked can thus be coupled together in lateral directions (i.e. kept from sliding laterally off of each other, and thus remaining stacked), but substantially uncoupled in the vertical direction. That is, the deck 120 at the top of the stack is kept from sliding laterally off of the stack, but is free to be removed from the stack simply by lifting it off.

It should be noted that the above described cells 40 and their various components may be made of any materials, and may be of any specific dimensions, that allow the cells 40 to support overlying hardscape and its commercial vehicle traffic while maintaining the soil within the cells 40 in a substantially uncompacted state and allowing for relatively unimpeded tree root growth therethrough. That is, the cells 40 must be sufficient to support the weight of the overlying hardscape and commercial vehicle traffic by themselves, while transferring little to none of this weight to the soil within, while also being large and open enough to allow for relatively unimpeded growth of tree roots within. Any such materials and dimensions that allow for this to happen are contemplated.

As one nonlimiting example, the various components of cells 40 may have certain specific dimensions as follows. The base 100 may measure 600×1200 mm, and the height as measured from the bottom of base 100 to the top of a rim 600 may be 110 mm. The deck 120 may have similar measurements (in one case, 592×1193×107 mm). Longer legs 300 may be 725 mm in length, 160 mm in diameter at their lower end, 158 mm in diameter at their upper end, and 153.7 mm in diameter at their central portion and as measured from the center of one longitudinal protrusion 320 to its opposite protrusion 320. The nominal wall thickness of longer legs 300 may be 3.175 mm, and the upper and lower portions may each be approximately 100 mm in length. Similarly, shorter legs 400 may be 365 mm in length, with the remaining dimensions being the same as those of longer leg 300.

One of ordinary skill in the art will realize that, for these and other dimensions, the base 100, longer legs 300, and shorter legs 400 may be made of injection molded high density polyethylene (HDPE), with the deck 120 made of a stronger material like a glass-filled resin. This glass-filled resin may be a 30% glass-filled polypropylene, or any other material of similar or greater strength. This is in contrast to prior designs such as those of U.S. Pat. Nos. 7,080,480 and 8,065,831, which both utilized 30% glass-filled polypropylene or stronger material for their entire cells, rather than the cheaper HDPE. Accordingly, embodiments of the present invention allow for significant cost savings in materials, as cheaper HDPE is used for a large portion of the cells 40. One of ordinary skill in the art will also realize that the invention is not limited to these dimensions or these materials, and instead contemplates any dimensions, and any corresponding materials, that lead to a cell that is capable of supporting overlying hardscape and its commercial vehicle traffic while maintaining the soil within in a substantially uncompacted state and allowing for relatively unimpeded tree root growth therethrough.

The above and other embodiments are configured to support the weight of overlying hardscape (e.g. a standard concrete or asphalt roadway, pavers, etc.) and aggregate that cover the entire upper surface of the cell, as well as commercial vehicle traffic (e.g., trucks, cars, emergency vehicles, and any other vehicles commonly found on roadways) thereover, to a degree at least equivalent to an H-20 loading condition. For example, the above and other embodiments can support a load of at least 21.0 psi when the hardscape 20 is pavers with concrete, and at least 15 psi when the hardscape 20 is just pavers.

As noted above, one notable advantageous application of cells 40 is stormwater management. As one example, cells 40 can be used to create a ponding area for storing rainwater runoff. In such an application, a number of cells 40 may be placed (not necessarily side by side) under hardscape, and may or may not be filled with soil. Trees 10 also may or may not be present. Ingress and egress for water are provided, such as a runoff drain or simply an open area in the overlying hardscape, as well as an underdrain that may extend into the volume outlined by cells 40 to convey excess water somewhere else, such as to a primary stormwater system.

Another application of cells 40 is that of underground bioretention systems. A bioretention system, sometimes referred to as a rain garden, is typically a volume of soil and/or other materials used to collect and hold runoff water, and remove pollutants therefrom. Stormwater is typically collected into a treatment area, which is an area of ground containing different layers such as a grass strip, sand bed, one or more organic layers, soil, and plants.

These layers collect the runoff water, filter and aerate it, support the growth of microorganisms which break down certain undesired compounds in the runoff water such as hydrocarbons, and absorb other undesired compounds. The "cleaned" runoff water then gradually propagates into the soil surrounding the bioretention system, evaporates away, or can be removed for use elsewhere. The cells 40 can create such a bioretention system underground. For example, the configuration of FIG. 1 can be filled not with solely conventional soil as in some above-described applications, but with layers that constitute a bioretention system. As above, such layers can include a sand bed, one or more organic layers, soil of any type, or the like. Embodiments of the invention encompass any material layers suitable for use in a bioretention system. Ingress and egress for runoff water may also be added if desired, such as drains or pipes that convey water into and out of the cells 40.

Runoff water is thus channeled into the cells 40, where the various layers as well as the roots of tree 10 filter, aerate, and break down pollutants in the water. The water is then taken up by the tree 10, evaporates, enters the surrounding soil, or is removed by the water egress. In this manner, cells 40 of embodiments of the invention can be deployed to create an underground bioretention system that serves the dual purpose of supporting tree growth and has the added advantage of utilizing the tree and its root system to improve the function of the system.

It should be noted that bioretention systems formed utilizing embodiments of the present invention offer significant advantages over conventional bioretention systems. For example, conventional bioretention systems are known to degrade over time. In contrast, it has been found that bioretention systems constructed according to embodiments of the present invention actually improve over time. In particular, as the trees within it grow larger and more mature root systems, the larger root system absorbs more water and removes more pollutants. It has also unexpectedly been found that the benefit imparted to bioretention systems by incorporating trees within is a greater than linear benefit. That is, such systems improve in greater than linear manner as a function of tree growth, with larger trees offering much more benefit (water absorption and pollutant absorption/breakdown) than smaller ones.

It should further be noted that these above mentioned advantageous embodiments all come with the further benefit of more efficient land use. The structural cells 40 are all sufficient to support conventional hardscape above. Thus, all of the above advantageous embodiments can be implemented belowground without compromising any of the conventional structures or systems aboveground. For example, bioretention systems, stormwater retention systems, and the like can all be implemented underneath sidewalks and streets, so that they do not reduce the amount of parking spaces available. Larger trees can be grown without reducing the amount of sidewalk available for walking. In this manner, the above described advantages can be accomplished without reducing the aboveground real estate available for conventional uses.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, the cells 40 can take on any shape besides rectangular, and can have any number of vertical supports, each of which can contain any number and combination of legs. The cells 40 can also be made of any material or materials sufficient to allow cells 40 to support overlying aggregate and hardscape as well as traffic loading. The embodiments were chosen and described in order to best explain the principles of the invention and its practical applications, to thereby enable others skilled in the art to best utilize the invention and various embodiments with various modifications as are suited to the particular use contemplated. Additionally, different features of the various embodiments of the present invention, disclosed or otherwise, can be mixed and matched or otherwise combined so as to create further embodiments contemplated by the invention.

What is claimed is:

1. A method comprising:
   placing a plurality of structural cells so that the structural cells are adjacent to each other;
   wherein each structural cell comprises:
   a base having a plurality of receptacles and a plurality of support members interconnecting the receptacles;
   a top; and
   a plurality of legs affixing the base to the top;
   wherein outer edges of the base, the top, and the legs affixed thereto define a volume, and are configured to support at least that portion of a hardscape overlying the top as well as a traffic load thereon, and ninety percent or more of the defined volume is free volume,
   wherein each receptacle is connected to the top by a pair of interconnected ones of the legs, each pair of interconnected ones of the legs comprising a first leg having a first length and a second leg having a second length, the first length being greater than the second length.

2. The method of claim 1, further comprising:
   filling the cells with a substantially loosely compacted soil, so as to allow roots of the tree to grow into the soil within the structural cells while simultaneously providing storage and pollutant removal of stormwater.

3. The method of claim 2, wherein the filling the cells further comprises filling the cells with material layers so as to form a bioretention system within the cells, each of the material layers being substantially uncompacted so as to allow roots of the tree to grow into the bioretention system within the cells.

4. The method of claim 1, wherein outer edges of the receptacles extend beyond outer edges of the support members.

5. The method of claim 1, wherein the base and the legs each comprise an unreinforced plastic.

6. The method of claim 5, wherein the unreinforced plastic is high density polyethylene (HDPE).

7. The method of claim 1, wherein the base, the top, and the legs attached thereto are sized and shaped to support a load of at least approximately 15 psi across substantially the entire top.

8. The method of claim 1, wherein:
   at least two of the receptacles lie along a first direction, and at least two of the receptacles lie along a second direction different from the first direction; and
   each of the legs has a cross-sectional shape having protrusions, the protrusions arranged so that, when each of the legs is attached to a receptacle, its protrusions extend in the first and second directions.

9. The method of claim 1:
   wherein the base is configured so that plural ones of the bases are stackable in a vertical direction so as to be substantially coupled in a lateral direction perpendicular to the vertical direction, and so as to be substantially uncoupled in the vertical direction; and wherein the top is configured so that plural ones of the tops are stackable in the vertical direction so as to be substantially coupled in the lateral direction and substantially uncoupled in the vertical direction.

* * * * *